United States Patent [19]

Sandstrom

[11] Patent Number: 5,727,900
[45] Date of Patent: Mar. 17, 1998

[54] CONTROL OF A COMPACTING MACHINE WITH A MEASUREMENT OF THE CHARACTERISTICS OF THE GROUND MATERIAL

[75] Inventor: Ake Sandstrom, Sollentuna, Sweden

[73] Assignee: Geodynamik H. Thurner AB, Stockholm, Sweden

[21] Appl. No.: 624,532

[22] PCT Filed: Oct. 14, 1994

[86] PCT No.: PCT/SE94/00965

§ 371 Date: Jun. 12, 1996

§ 102(e) Date: Jun. 12, 1996

[87] PCT Pub. No.: WO95/10664

PCT Pub. Date: Apr. 20, 1995

[30] Foreign Application Priority Data

Oct. 14, 1993 [SE] Sweden ................... 9303387

[51] Int. Cl.$^6$ .................. E01C 23/07; E01C 19/26; G01M 7/00
[52] U.S. Cl. .............. 404/84.1; 404/84.05; 404/122; 73/12.12; 73/594; 364/508
[58] Field of Search .................. 404/84.05, 84.1, 404/128, 130, 117, 122; 73/579, 594, 784, 12.12; 364/508

[56] References Cited

U.S. PATENT DOCUMENTS

| | | | |
|---|---|---|---|
| 3,813,929 | 6/1974 | Hardin et al. | 73/84 |
| 3,909,147 | 9/1975 | Takata | 404/117 |
| 3,946,598 | 3/1976 | Towne et al. | 73/67.1 |
| 4,103,554 | 8/1978 | Thurner | . |
| 4,149,253 | 4/1979 | Paar et al. | 364/505 |
| 4,330,738 | 5/1982 | Paramythioti et al. | 318/128 |
| 4,348,901 | 9/1982 | Vural et al. | 73/594 |
| 4,577,995 | 3/1986 | Sadahiro | 404/117 |
| 4,759,659 | 7/1988 | Copie | 404/117 |
| 4,870,601 | 9/1989 | Sandstrom | 364/550 |
| 5,426,972 | 6/1995 | Heirtzler et al. | 73/84 |
| 5,614,670 | 3/1997 | Nazarian et al. | 73/146 |

FOREIGN PATENT DOCUMENTS

| | | |
|---|---|---|
| 3 308476 | 10/1983 | Germany . |
| 9 300776 | 9/1994 | Sweden . |
| WO/82 01905 | 6/1982 | WIPO . |

*Primary Examiner*—Tamara L. Graysay
*Assistant Examiner*—Gary S. Hartmann
*Attorney, Agent, or Firm*—Birch, Stewart, Kolasch & Birch, LLP

[57] ABSTRACT

A compacting machine having a vibrating drum for compaction of ground material includes a controller. The drum is moved over a segment of the ground while a shear modulus and a plastic parameter of the segment of the ground are measured. From the measurements, in particular the value of the shear modulus, values for the frequency and/or the amplitude of the vibration and/or the rolling velocity of the drum are determined. These values are used for adjusting the compacting machine. In the measurement of the shear modulus, two accelerometers are used for determining, during the passing of the segment of the ground, the acceleration of the drum in at least an essentially vertical direction. The amplitude and the phase position of the eccentric system in relation to the acceleration are determined by using, among other things, a pulse sensor. Therefrom, and from fixed data concerning the compacting machine, the shear modulus of the ground is determined by integration of state equations. Then, the plastic parameter is obtained.

28 Claims, 6 Drawing Sheets

CONTROL OF A COMPACTING MACHINE WITH A MEASUREMENT OF THE CHARACTERISTICS OF THE GROUND MATERIAL

FIELD OF THE INVENTION

The present invention concerns methods and devices for automatic control of a compacting machine and for measurement or determination of characteristic mechanical quantities of a "ground" material or segment, the term ground here denoting a surface layer to be compacted, located underneath the compactor, directly from vibratory data measured in a vibrating compacting roller passing over the ground, where the control advantageously can use this measurement or determination.

BACKGROUND OF THE INVENTION

When compacting a ground material using a vibrating compacting machine it is advantageous if an automatic system is built into the compacting machine, the system being able to adjust parameters of the machine such as frequency, amplitude and rolling velocity to the varying conditions of the ground, so that a homogenous compaction of the ground is achieved in the shortest possible time. Such a control should then be performed in such a way that the machine, to the highest possible extent, at all times and at all possible grounds is able to produce a maximum transfer to the ground of energy effective in the compacting work. It is previously known that a vibrating roller rolling over a granular material results in a compression or a compaction in a zone below the contact area between the roller and the ground material whereas at least close to the surface both in front of and behind this zone a decompaction of the material is achieved. The compaction work on each small area segment will therefore comprise a sequence of decompaction, compression or compaction and decompaction for each pass. It is therefore essential to speak in terms of effective compaction energy and not only of the total performed compaction work.

During the compacting work, besides a high compaction effect, a result which is as homogenous as possible is desired, i.e. that the ground material gets an even carrying capacity.

From the U.S. Pat. No. 4,103,554 it is previously known to determine the degree of compaction of a ground material as a function of the amplitude of the compacting cylinder. This amplitude is measured at the ground frequency and at harmonic overtone frequencies and a comparison of the measured frequencies provides a measure of the degree of compaction of the ground. The result of this comparison can be used as a control signal in an automatic control system for the compaction, such as for setting the vibration frequency, the vibration amplitude, etc.

From the International Patent Application WO-A1 82/01905 another method is previously known for measuring the degree of compaction of a ground material using a vibratory apparatus.

In the published German patent application DE-A1 33 08 476 a method for controlling the amplitude of vibrating cylinders is disclosed. The control does not use any estimate of the degree of compaction but merely monitors that the movement of the vibratory roller is sufficiently regular by using signals from two sensors, one at each end of the compacting cylinder.

In a Ph.D dissertation, Grabe, Karlsruhe 1992, a simulation program for vibratory machines is presented, which uses different mechanical parameters for a ground material to be compacted. A method is here also outlined for numerically solving the inverse problem, i.e. for calculating from the signals detected by the machine, the mechanical parameters of the ground, generally a soil material. A concrete method is however not disclosed but a principal discussion is presented, intended to serve as a basis for the future work aiming at automatically controlled rollers.

In the Swedish patent application SE-A 9300776-3, "Optimal control of a compacting machine" ("Optimal styrning av vält"), filed Mar. 8, 1993, a method for controlling a vibrating roller machine in an efficient manner is described. The amplitude and frequency of the vibration and possibly other quantities of the roller machine are controlled so that the resulting vibration movement of the roller cylinder will comprise a predetermined and small proportion of harmonic vibration having a frequency corresponding to half the vibrational frequency that is imparted to the cylinder. In this control method a direct measurement of the mechanical characteristics of the ground material is not used.

SUMMARY OF THE INVENTION

According to the invention methods and devices of the kind mentioned in the introduction are provided, by means of which an automatic control depending on characteristics of a ground material can be obtained. A measurement of these characteristics can be carried out almost instantaneously for each small passed segment of the ground.

A control is thus intended for a compacting device, such as a motorized compacting machine, which comprises a compaction body to which a vibration is imparted by an eccentric system. The compaction body is made to pass over a ground material to be compacted, in contact therewith, with a predetermined velocity and in a predetermined direction. It is usually a roller cylinder or drum, rolling over the ground and in contact therewith, but may also have another shape, such as a flat body. The following steps are carried out:

- initial values are selected for the amplitude and frequency of the vibration and the transport velocity of the compaction body, i.e. usually the rolling velocity of the roller machine or the roller cylinder,
- the eccentric system is set so that the amplitude and frequency of the vibration will have the selected initial values, and the transport velocity of the compacting body over the ground is given the selected initial value,
- the compacting body is driven a short distance over the ground while characteristic quantities of the ground segment passed, such as in particular the shear modulus and a plastic parameter, are determined,
- depending on the values of the characteristic quantities, in particular the shear modulus and the plastic parameter, new values of the frequency and/or of the amplitude of the vibration and/or the transport velocity of the compacting body over the ground material are calculated,
- for the different cases the eccentric system is set so that this new value or these new values, respectively, of the amplitude and the frequency of the vibration are obtained, and/or the transport velocity of the compacting body, and for the special case the rolling velocity of the roller cylinder, is set to the new value, whereafter the last three steps are repeated during all of the time when the compacting body is moved over the ground.

A new value of the frequency of the vibration is advantageously chosen from the relation $f=f_{nom}(G/G_{nom})^q$, where $f_{nom}$ is an initially set frequency of the vibratory system, $G_{nom}$ is an nominal shear modulus which is assumed for the ground material, G is a shear modulus, which has been determined during the pass of a segment of the ground and q is a positive number between 0 and 1. The exponent q is preferably in the range of 0.25 to 0.4 and in particular essentially equal to ⅓. A new value of the amplitude of the vibration is then chosen as large as possible considering the mechanical strains on the compacting apparatus and in particular the bearings thereof.

For supervision of the stability of the compaction process, i.e. whether the compacting body has a stable vibration without double jumps, the acceleration of the compacting body is used, which is determined as a function of time during the movement of the compacting body over the ground and which can also be used for determining the mentioned shear modulus and the plastic parameter. If it is determined that a non-stable vibration exists, the eccentric system is set so that the amplitude of the vibration is maintained but the frequency is reduced until a desired degree of stability is obtained. As an alternative the eccentric system is set so that both the amplitude and the frequency are reduced, until a desired degree of stability has been obtained. A measure of stability is the proportion of harmonic vibration in the vibrational movement of the compacting body and in the special case the vibrational movement of the cylinder, which has a frequency corresponding to half the frequency of the eccentric system, or more particularly the ratio of the amplitudes of the harmonic vibrations in the vibrational movement of the compacting body, which have frequencies corresponding to half the frequency of the eccentric system and to the frequency of the eccentric system. Thereafter this determined ratio is in usual manner compared to a predetermined value, and a stable vibration is decided to exist if the ratio or quotient is below this predetermined value.

When a cylindrical compacting body such as a rolling cylinder is used, a new value of the transport velocity of the compacting body can be chosen proportionally to (the radius of the compacting body*maximum plastic deformation)$^{1/2}$, i.e. essentially the depth of the depression formed when or after the compacting body sinks into the ground. As an alternative the new value of the transport velocity of the compacting body can be chosen proportionally to (the radius of the compacting body*the plastic parameter of the ground) $^{1/2}$, i.e. essentially the width of the depression made when the compacting body sinks into the ground influenced only by the static load, with which the compaction apparatus including the compacting body acts on the ground material. According to a third alternative the new value of the transport velocity of the compacting body can be chosen so that the transport distance per cycle of the excitation of the vibratory system is constant.

To measure characteristic quantities such as the shear modulus and a plastic parameter of a ground material, which is compacted by a compacting tool of the above kind mentioned, the following steps are performed during the movement of the compacting body over an area segment of the ground:

the acceleration of the compacting body as a function of time is determined at least in an essentially vertical direction or in a direction, forming a relatively small angle, e.g. less than 45°, to a vertical line and essentially located in a vertical plane parallel to the movement direction of the compacting body over the ground material, e.g. by using at least one accelerometer mounted at a suitable location at the compacting body and usually at the roller cylinder, the shaft, bearings or supporting parts thereof, by means of suitable sensors the amplitude and the phase position of the eccentric system are determined relatively to the determined acceleration, from the determined acceleration, such as by means of mathematical integration, the corresponding displacement is determined as a function of the time, therefrom and from fixed data of the compacting apparatus and the eccentric system, in particular the mass of the compacting apparatus and the mass and amplitude of the eccentric system, the shear modulus of the ground is determined.

Advantageously two accelerometers are used which are placed to sense the acceleration of the compacting body in two directions perpendicular to each other, which in addition both are essentially perpendicular to the horizontal axis of the compacting body, which in turn is perpendicular to the travelling direction of the compacting body over the ground, i.e. when the compacting body is a roller cylinder they are both essentially perpendicular to the rotational axis of the cylinder. One of the accelerometers can as above measure in an essentially vertical direction while the other measures in an essentially horizontal direction, parallel to the direction of movement.

When determining the quantities characteristic of the ground material and especially the shear modulus of the ground and also a plastic parameter the determined acceleration function and/or the displacement function of distance can be evaluated to determine those times at which a change of state occurs for the compacting by means of the compacting tool, i.e. when a transition occurs between those time periods, during which:

the compacting body moves mainly into or away from the ground with an essentially elastic or viscoelastic behaviour of the ground material, the compacting body compacts the ground which also has a plastic behaviour, the compacting body has little or no contact with the ground and moves essentially freely vibrating.

During these different stages different equations are valid for the movement of the compacting body, which may be evaluated for determining the desired quantities.

The measurement can also be used in the automatic control of the compacting apparatus and also for displaying independently thereof the calculated values to an operator of the apparatus and for storing the values for a documentation of the compacting work during the travel of the compacting apparatus over the ground.

Other objects and further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENT

Figure 1:
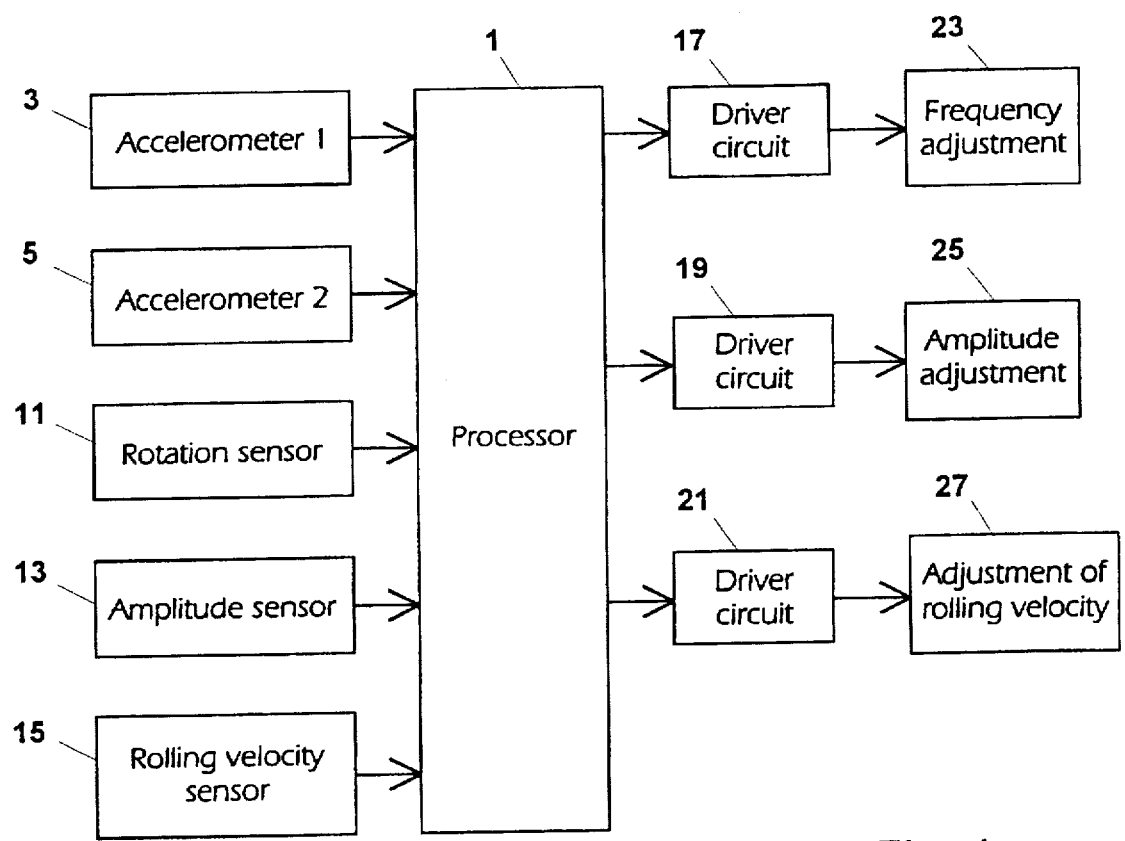
FIG. 1 is a block diagram of a system for controlling a compacting machine.
Figure 2:
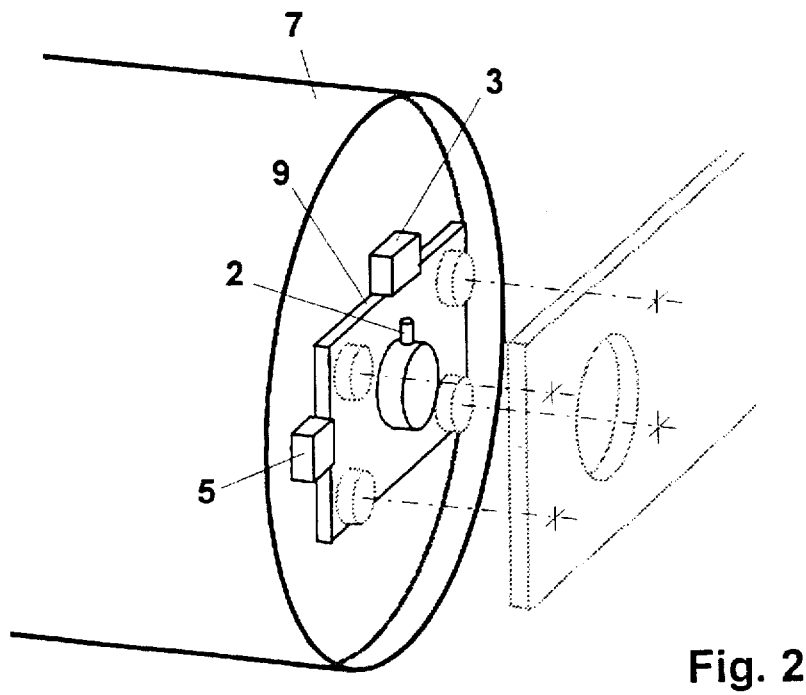
FIG. 2 shows the location of two movement sensors and an eccentric position sensor, used in the system.

In FIG. 1 the schematic construction of the control system according to the invention is shown. A control unit such as a microprocessor 1 receives input signals from two accelerometers 3 and 5 respectively which generate a signal representing the acceleration of a roller drum 7, which is a part of a compacting apparatus such as a compacting roller machine, see FIG. 2, in a vertical and horizontal direction respectively. The accelerometers 3 and 5 thus measure the acceleration in two directions which are located in a vertical plane parallel to the movement direction of the roller drum 7 and which advantageously are perpendicular to each other but in any case should not form too small of an angle to each other. They may be attached to a bearing bracing 9 cushioned to the frame of the compacting machine, as shown in FIG. 2. The accelerometers 3 and 5 are thus placed, so that they record the acceleration of the compacting drum in directions, which are essentially perpendicular to the rotational axis of the roller drum 7 and which also intersect this axis.

The microprocessor 1 also receives signals from a rotation sensor 11, which provides a signal indicating the position of the eccentric weight (not shown) and especially the rotational frequency of an eccentric weight and the phase position thereof in relation to the acceleration signals from the accelerometers 3 and 5. The rotation sensor may be implemented by suitable electronic circuits together with a pulse transducer 2, see FIG. 2, which provides an electric pulse every time when the eccentric weight passes. The eccentric weight activates the vibration of the roller drum 7. The control unit i also receives a signal from an amplitude sensor 13 providing a signal representing the eccentricity of the eccentric weight. Finally the microprocessor also receives a signal from a sensor 15 providing a signal indicating the rolling velocity of the compacting machine or as an alternative the distance rolled by the drum.

The microprocessor 1 also emits control signals to driver circuits 17, 19 and 21 for setting the frequency of the eccentric weight 23, for adjustment devices 25 for the amplitude of the eccentric weight and for adjustment devices 27 for the rolling velocity of the roller machine.

The control unit 1 thus emits setting signals, primarily for setting the frequency and amplitude of the eccentric system, so that a compaction which is as effective as possible is achieved for each area segment during the several passes of the compacting machine thereover. The control signals are determined by the control unit 1 based on the signals from the different connected sensors.

Various physical conditions limit the number of combinations of frequency and amplitude, which can be set for the eccentric system. These conditions are mainly associated with the following:

1. The sizes of the eccentric weights are limited by the physical dimensions of the drum and by strains on bearings in the compacting machine.
2. Hydraulic pumps and driving motors for driving the eccentric system provide an upper limit for allowed or possible frequency.
3. Combinations of a high frequency and a high amplitudes cannot be used since they lead to an overload of the excitation system of the drum and in particular the bearings thereof.
4. Certain special frequencies must be avoided, since they cause resonances in the compacting machine.
5. Too low frequencies of the eccentric system must be avoided as a rule in order to limit resonances in the frame of the compacting machine.

Figure 3:
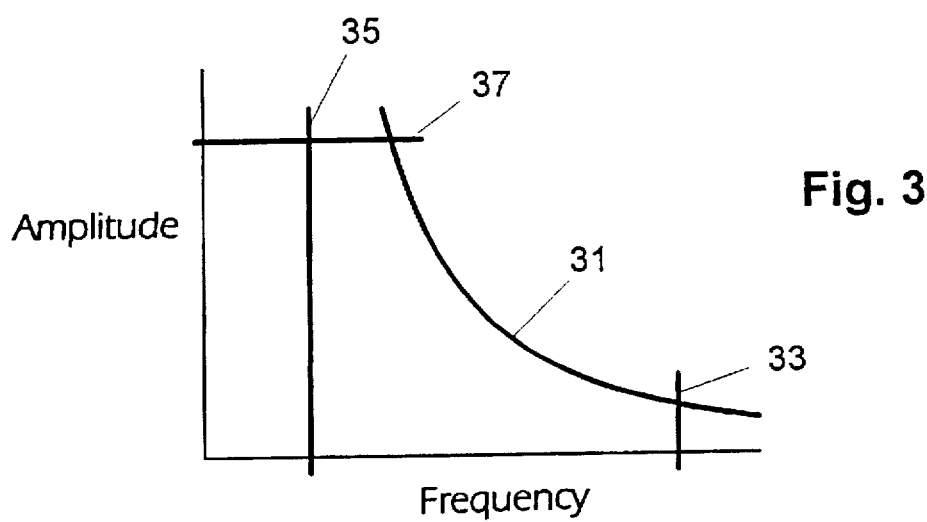
FIG. 3 is a diagram, in which an operating range of the setup-parameters of the compacting apparatus is shown.

The allowed combinations of amplitude and frequency appear from the diagram of FIG. 3. In the diagram the permitted area is shown as located on one side of different limiting lines with the excitation frequency plotted as abscissa and the amplitude thereof as ordinate. The arc-shaped curve 31 having an approximately hyperbolic shape sets the condition according to item 3. This curve must hence not be exceeded due to the fact that outside it too large strains will be obtained on the construction and in particular the bearings thereof. The line 33 for maximum frequency refers to item 2 above and the straight line 35 for minimum frequency is according to item 5 above. The curve 37 for maximum amplitude is associated with item 1 above.

In FIG. 3 the amplitude is the nominal amplitude of the vibration of the cylinder, when freely vibrating. When the cylinder rests against the ground, the amplitude is affected and harmonic and subharmonic components are introduced due to non-linear characteristics of the system. The material to be compacted, is often soil and it is a medium having non-linear characteristics. In addition the cylinder is influenced only by compressive forces and not by any substantial tensile forces from the ground.

In some cases, e.g. when a granular material is to be compacted, some limitation must be introduced due to the limited strength of the individual granules, to avoid breaking them.

The ground material to be compacted by the roller, is primarily characterized by a shear modulus G and a plastic parameter p. The shear modulus for soil is strictly speaking not a material constant, but the value thereof is dependent on amongst other factors the deformation magnitude and the deformation velocity. Here is meant an average dynamic G-module for an average dynamic deformation in the soil layer for the dynamic action by the roller. The parameter p corresponds to the depth of the remaining deformation or the maximum depression which would be obtained, if the cylinder was placed on the ground and then was removed again, i.e. by loading the ground with a pure static load equal to the mass of the roller. From now on a specific parameter combination will be assumed to exist, corresponding to a middle position during the compaction of a soil material, i.e. the situation after a few passes of the compacting cylinder over the material. The acceleration of the drum in a plane perpendicular to the axis thereof then in principle looks as is shown in the diagram of FIG. 4.

The impacts on the ground and the lack of tensile strength of the soil and in the area of contact between soil and cylinder gives a deformation of the acceleration curve compared to the pure circular shape of the curve obtained when the cylinder vibrates freely or on a very soft and elastic ground material.

Figure 4:
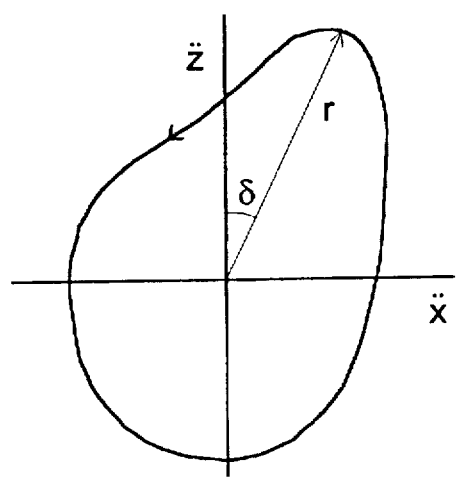
FIG. 4 is a diagram showing the acceleration of a compacting cylinder in two directions perpendicular to the axis of the cylinder.

As shown in FIG. 4, the largest acceleration is not obtained in a vertical direction but in a direction forming an angle δ to a vertical line and forwards or backwards as seen in the travelling direction of the roller. This depends on the fact that the contact area of the cylinder with the ground is not symmetric and on characteristics of the vibratory excitation.

When the cylinder rolls over the ground a bank is obtained in front of and behind the cylinder and the compression of the ground makes that the surface of the ground behind the cylinder, as seen in the movement direction of the cylinder, is located lower than that in front of the cylinder. The degree of asymmetry depends mainly on the current compaction degree of the ground material, on the material and on the rolling velocity of the cylinder as well as on the rotation direction of the eccentric system in relation to the direction of rotation of the cylinder and also on the radius of the roller drum in relation to the grain size of the ground material.

The curve according to FIG. 4 is recorded by using the accelerometers 3 and 5, see FIGS. 1 and 2. The curve is recorded for every cycle of excitation, i.e. for every full turn of the eccentric system. The direction that has the largest amplitude is calculated after each such cycle, i.e. its angle δ to a vertical line is determined. This direction will fluctuate somewhat during the calculations and in order to remove these statistical variations a low pass filtering or a mean value calculation is advantageously performed over several successive excitation cycles.

The direction having the largest amplitude usually forms a relatively small angle δ to a vertical direction and it turns out, during the relatively rough calculations required, that it is sufficient that only the acceleration in the vertical direction is determined. It means that an acceptable determination can be achieved using only one, properly placed, accelerometer (3). The angle δ is in itself a measure of the state of the ground material and may be used as a parameter for the result.

Figure 5:
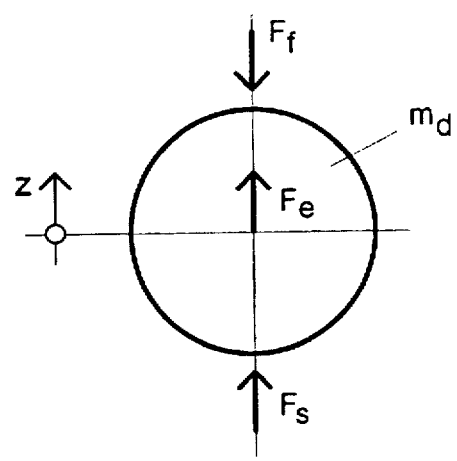
FIG. 5 shows schematically the different forces, acting on the cylinder vertically.

The determination forces are considered, which extend in the direction of the maximum amplitude at the angle δ, see FIG. 4. For simplicity however, from now on only forces acting on the cylinder in a vertical direction and as shown by FIG. 5 are considered, it having no importance for the principal discussion or for the result of the corresponding calculations, since the direction having the maximum amplitude usually, as has been pointed out, is nearly vertical. The force $F_f$ is the force of gravity from the mass of the roller and $F_f$ is assumed to be constant. This assumption is valid for most cases, since the connection of the drum to the frame of the roller is very soft, so that a possible dynamic component of the force $F_f$ can be neglected. $F_s$ is the force of reaction from the ground and $F_e$ is the vertical component of the rotating eccentric force, which generally has a sinusoidal behaviour. The equation of forces in a vertical direction, along the z-axis, then becomes:

$$m_d \, d^2z/dt^2 = -F_f - m_d \, g + F_e + F_s \tag{1}$$

where $m_d$ if the mass of the cylinder and g is the acceleration of gravity.

Figure 6:
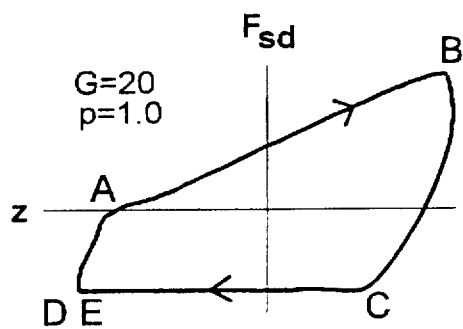
FIGS. 6–8 are diagrams showing the variation of the dynamic force of reaction acting on the cylinder from the ground as a function of the vertical deviation of the cylinder from a middle position.

The force of contact or the force of reaction $F_s$ from the ground passes through different stages during a cycle of excitation. Such a cycle can be one or two periods of the excitation frequency for the vibratory system. The different stages are illustrated in FIG. 6, which is a simulated curve for a ground material in the beginning of the compacting process. The diagram in FIG. 6 shows in particular the dynamic component $F_{sd}$ of the force of reaction or the force of contact $F_s$ as a function of the vertical deviation of the cylinder from its nominal position.

The curve ABCDEA in FIG. 6 reflects the different stages of the compaction process. The points D and E coincide in this case but are needed for the description of more complicated compacting processes below. The different parts of the curve are characterized in the following.

In the stages BC and EA the cylinder moves away from and into the ground respectively and these stages are characterized by:

a contact between cylinder and ground, no plastic deformation, approximative viscoelastic relationships for the ground material.

These stages can be described by the following equation, written using the laplace transform:

$$\tilde{z} = A \cdot H(s) \cdot \tilde{F}_s \tag{2}$$

where A is a amplitude factor, which independent of the frequency and is a function of the elastic (G) and plastic (p) parameters of the ground material and of the density of the material and Poisson's ratio and also of the dimensions and mass of the cylinder.

The amplitude factor can be expressed by the equation:

$$A = k_o \frac{1}{G} \ln \left[ \frac{k_1}{\sqrt{p}} \right] \tag{2a}$$

H(s) is a factor dependent on frequency, which besides the soil and cylinder parameters also is a function of the complex frequency s. The factor H(s) can advantageously be approximated by a function having two poles and real coefficients and can be written as follows:

$$H_s = \frac{1}{1 + \frac{1}{\omega_0 Q} s + \frac{1}{\omega_0^2} s^2} \tag{2b}$$

where $\omega_0 = k_2 \sqrt{\frac{G}{p}}$ , $k_2$ is a constant and $Q \approx 0.3$.

During the stage AB the actual compaction of the ground material is made and this stage is characterized by a contact between cylinder and ground loading, i.e. $dF_s/dt > 0$, $dz/dt < 0$ both plastic and viscoelastic deformations, non-linear relationships.

The plastic part of the deformation of the ground material during this phase can for a cylinder, which penetrates into a ground that is flat from the beginning and of a material with friction, be approximated by an equation:

$$z_p = p \cdot (F_s/F_s^{start})^\mu \tag{3}$$

where p=the plastic parameter of deformation defined as the plastic deformation when loading the ground only with the static load of the compacting apparatus, u is a constant exponent, which has a value close to 1, and $F_s^{stat}$ is the static part of the contact force $F_s$, i.e. the part which originates only from the mass of the compacting apparatus including the cylinder.

By means of equation (2) applied to stage BC and the equations (2) and (3) to stage AB values of the shear modulus G and the plastic parameter p are calculated.

During the stage CD the cylinder is in the air or at least has a small contact with the ground material and is only influenced by the force of gravity and the eccentric force.

During successive passes over the same segment of the ground the rigidity of the ground material is gradually increased and the response of the cylinder is then altered. If the amplitude of excitation is large enough and the energy losses in the ground are low, double strokes may occur with a hard stroke against the ground every other period of the frequency of excitation. This phenomenon is shown by the curve in FIG. 8. A transition state between normal excitation and the very strong excitation shown in FIG. 8 is illustrated by the curve in FIG. 7.

Figure 7:
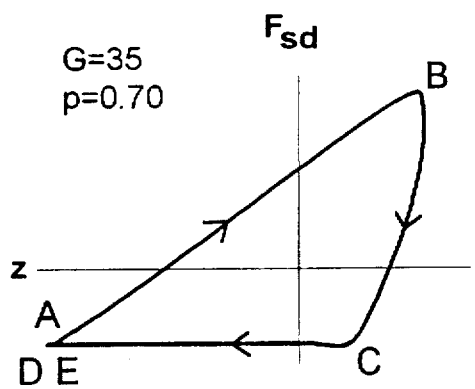
Figure 8:
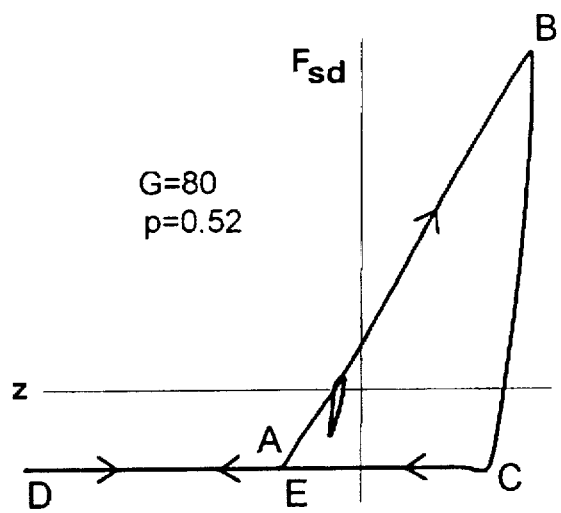

The curve in FIG. 8 shows, unlike the curves in FIGS. 6 and 7, the dynamic force of contact $F_{sd}$ during two cycles of excitation. During the stage AB in FIG. 8 a small loop shaped segment of the curve is visible and this corresponds to a stroke of the exciting mechanism, occurring when the cylinder has a small contact with the ground without entirely leaving it. The cylinder performs at this segment a temporary unloading and continues then with a normal loading stage. The course of events during the phases BC and CD are mainly in accordance with the normal course according to FIG. 6, but with an increased force of striking and a larger movement of the cylinder. The points D and E are here separated, so that a new stage DE arises, in which the cylinder moves freely downwards (to the right in the curve of FIG. 8) differing from the stage CD, where the cylinder moves freely upwards from the ground. Further, the stage EA disappears in this case since the points E and A coincide.

In FIG. 7 a transition state is shown without any double strokes but with a short stage DE, where the cylinder falls freely downwards, and without any stage EA.

To sum things up, the way of calculating the parameters of the ground material is as follows. Based on a known acceleration during one or two full turns of the eccentric system and known parameters of the roller machine the force in the contact surface between the cylinder and the ground is calculated by means of equation (1). Then the following steps of calculation are made:

1. The position of the cylinder is calculated by means of double integration of the measured curve of acceleration for at least one or preferably two full eccentric turns (compare what is said below).
2. The times for the change of stages are determined, e.g. by means of the calculated curve or better still from the calculated movement/contact force curve according to FIGS. 6–8, i.e. the points A, B, C, D and E are determined.
3. The parameters p and G are calculated by means of the equations (2) and (3).

The result can be calculated for every cycle, which during normal operation corresponds to one full turn of the eccentric system and in the case of double strokes corresponds to two turns of the eccentric system, but it can be practical to always perform the calculations for two successive cycles of the excitation system. The calculated values will show statistical fluctuations due to noise of different kinds, etc. Therefore it is advantageous to low-pass filter the results, i.e. an averaging can be carried out for calculations of some successive cycles, in order to reduce these statistical variations.

Figure 9:
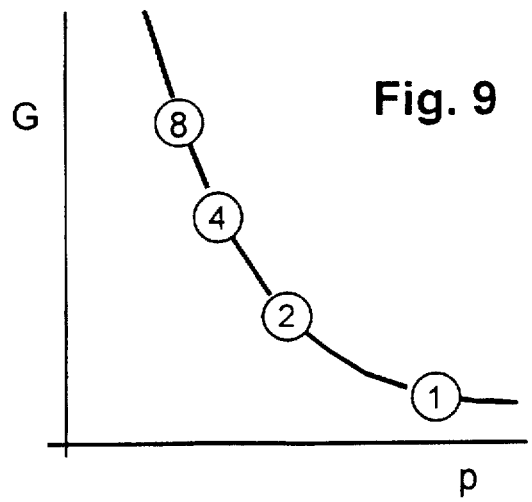
FIG. 9 shows the changes of parameters for a typical ground, when it is gradually compacted during several passes of the compacting apparatus.

During compaction of a ground material such as a soil material the parameters p and G are of course changed. The material becomes more rigid, that is G increases and at the same time the plastic deformations are reduced for every pass. The material will then behave more and more elastic. The parameter p will hence decrease. The relationships are shown in a principle form in FIG. 9. Figures inside the circles denote the number of the pass of the roller, so that the value at 1 corresponds to the conditions at a first pass over a certain area segment, the value at 2 corresponds to the conditions when the compacting machine passes over the same segment at a second time and so on.

The parameters p and G are calculated or determined continuously during the travel of the roller over the ground, for instance in the way described above, and provides information of the stage in the compaction process which is at hand. It also applies to the calculated angle δ. Both the shear modulus G and the plastic parameter or either of them can in a suitable manner be indicated to a driver of the roller, e.g. by continuously displaying digital values thereof on a display in the driver's cabin. It allows a manual control of the roller, which can be used when it is not suitable or desirable to use the automatic control method described below. These continuously determined values can also be stored in a data base for a documentation and/or for a later evaluation of the performed compacting job.

For a specific roller machine and a ground material there is an optimal frequency, which is approximately the state, that after many years of experience has turned out to be an optimal adjustment of the roller for an average state of a typical ground. This optimal frequency is called the nominal frequency $f_{nom}$ of the roller machine. Such a ground material for which this frequency is optimal, is further assumed to be characterized by a nominal G-module $G_{nom}$ and a nominal amplitude $A_{nom}$ of the vibration system which is assumed to give the best compacting effect for this nominal frequency and the ground material in question.

Investigations of compacting effect and vibrational state for the roller machine by means of simulated models have shown that there is a relationship that describes how the frequency should be altered when the calculated shear modulus differs from the nominal module $G_{nom}$. The relationship can be approximated by the function:

$$f = f_{nom} (G/G_{nom})^q \qquad (4)$$

where the exponent q is a constant having a value between 0 and 1 and usually is essentially equal to ⅓, or at least has this magnitude of order.

In practical cases an operator can estimate the properties of a ground compared to this nominal ground and can then, in the control, choose to enter manual information of the ground, e.g. in three steps having the labels "SOFT, MEDIUM, HARD", denoting the estimated stiffness of the ground. Such entered, correct information can then reduce otherwise unnecessarily long initial transient times for the system. If such information should be lacking, the control system must start with nominal values of frequency and amplitude according to the above.

An automatic control method for the compacting machine will be described with reference to the curves of FIGS. 10a and 10b, which correspond to FIG. 3 and in which the different curves of limitation are drawn.

First it is assumed that we know that the material is not compacted from the beginning and is relatively homogenous. The compacting process is then illustrated by the curve in FIG. 10a, in which the figures inside the circles denote different states, where the working parameters of the roller machine are changed. The first pass starts with working parameters at the position marked with 1 in FIG. 10, i.e. at a low frequency but with a maximum amplitude.

When the roller then has rolled a few decimeters, the control system has calculated values of the parameters G and p, which can be used for calculating a suitable frequency according to equation (4). For this frequency the largest possible amplitude is chosen and the operation point is then moved to e.g. state 2 on the mechanical curve 31 of limitation. If the new state results in an unstable vibratory state, the frequency is then reduced but the amplitude is maintained, until the vibration has been stabilized. If an instability should not occur, the state at 2 can be used. However, in the example in FIG. 10a an instability is assumed to occur and then the operational point is changed to the state at 3 having a reduced frequency in the next step. It will then be possible to maintain this setting during the travel of the roller machine over the whole area of the material that is relatively homogenous from the beginning. At the next pass, when the material already is somewhat compacted, normally an operation point with settings shown at the point 4 in FIG. 10a will be used and at later passes states at points 5, 6, . . . will be chosen, which are located on a curve, which e.g. is essentially parallel to the mechanical curve 31 of limitation or has been derived therefrom by reducing, for a certain amplitude, the frequency to a predetermined proportion of the frequency given by the curve 31. The force of excitation will hereby all the time be limited to a certain proportion of the maximum allowed force of excitation.

Figure 10A:
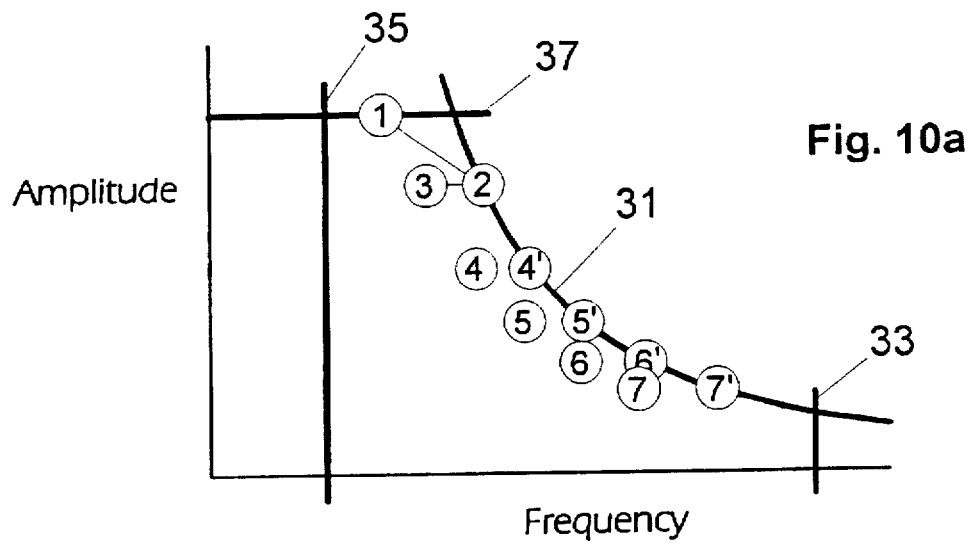
FIGS. 10a and 10b illustrate automatic control methods for the compacting machine in typical cases.
Figure 10B:
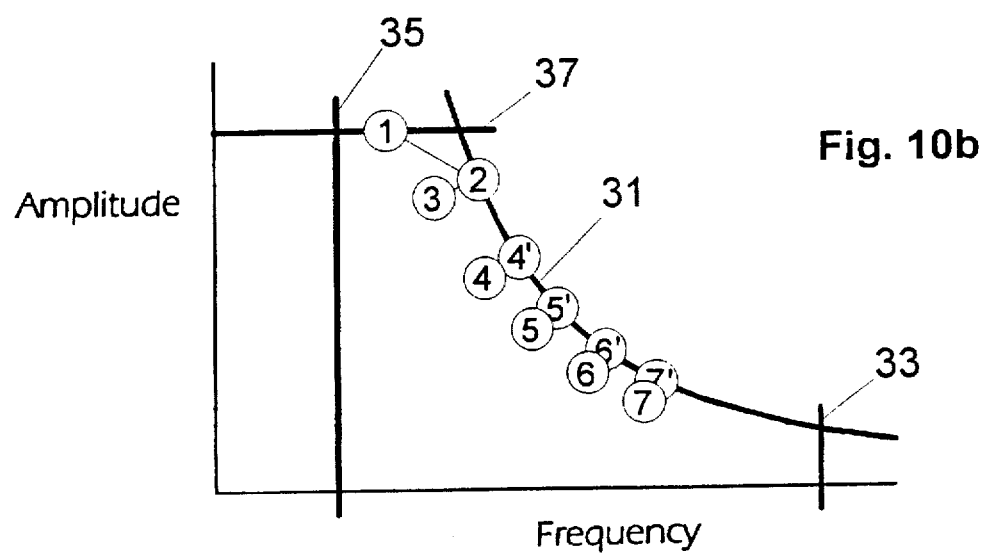

If an instability should not exist, the states in the passes following the first pass are still located on the maximum curve corresponding to the curve 31 in FIG. 3, i.e. at the points 4', 5' . . . in FIG. 10a.

The frequency is adjusted at the transition to the next pass according to equation (4) above, as the stiffness of the ground material increases. It is actually a continuous process and hereby inhomogeneities in the ground are considered. If desired, the working point, after a transition to a more stable state, may be allowed to gradually approach the mechanical curve 31 of limitation. The frequency is then, if needed, reduced, so that the vibration of the cylinder remains stable.

Instead of only reducing the frequency of excitation at the detection of an unstable state both it and the amplitude of vibration can be reduced. It corresponds to a displacement along a line having a slope to the left and downwards, e.g. perpendicular to the curve 31 of limitation, in FIGS. 10a and 10b. In the latter Figure this procedure in the control is illustrated. When it thus is decided that at point 2 an unstable compaction process is obtained, the parameters of the eccentric system are changed to the point 3 having a reduced frequency and amplitude. This can give a faster change of the system, since the setting parameters as a whole must be changed less, which is indicated by the fact that the movements in the diagram are also smaller in this case. It can be advantageous to move when searching for a sufficiently stable state, along a straight line, which is approximately perpendicular to the isolines for a factor s of stability, which usually are nearly parallel to the mechanical curve 31 of limitation. During the second pass that state is chosen in the same manner as above which is indicated at 4, while if a sufficient stability during the compacting is found to exist, the state at 4' is used.

Figure 11:
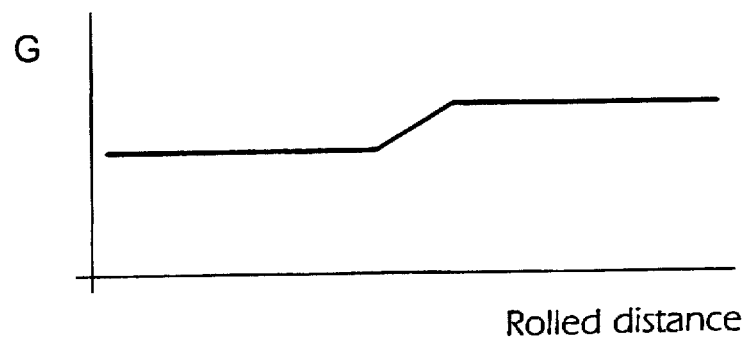
FIG. 11 shows a curve of the shear modulus for a ground material having a single inhomogeneity.

The ground material can also be inhomogeneous, e.g. at one place have a suddenly increasing rigidity, as is illustrated by the case according to the curve in FIG. 11, which shows the shear modulus of the non-compacted ground material as a function of the distance from the starting point of the roller machine. The roller machine starts as before in a state shown at the point 1 in FIG. 10a. The parameters of the roller are rapidly controlled to the state at point 2 and then to the state at 3 as above. After some time when the roller reaches the area of material having a higher shear modulus, the working parameters, at this first pass, are controlled to the state shown at e.g. 5 in FIG. 10a, which is valid for the whole remaining part of the first pass. When the roller starts its second pass, which is assumed to be at the same place as the first, the working state is chosen at the point 4 and for the area having a higher rigidity a state, e.g. at the point 6, is chosen. The corresponding procedure is repeated at possible following passes.

As a criteria for "stable vibration" the "proportion of half tone" is used, i.e. the amplitude of a component in the signal having a frequency equal to half the frequency of excitation in relation to the amplitude of the ground tone. This is described in detail in the above mentioned Swedish patent application "Optimal control of a compacting machine", which is incorporated herein by reference. As stated therein, it is often advantageous, that a certain proportion of half tone exist, and "stable vibration" is hence intended to mean a proportion of half tones, which is lower than some predetermined limit value. A suitable such value can be 5%.

The transport velocity of the roller is also controlled by the control unit, but the driver of the roller has of course always priority and can choose to deviate from the velocity desired by the control system. Thus the velocity can be set in the simplest way, so that it is determined by the used frequency in such a manner that a constant rolled distance is travelled during one period of the ground oscillation of the eccentric system. This ground value may need to be adjusted considering primarily the calculated value of the plastic parameter p, so that the distance between the blows on the ground will be adapted to the size of the depression, which the cylinder causes. As an alternative the rolling velocity can then be chosen proportionally to (the radius of the cylinder*maximum plastic deformation)$^{1/2}$, where the maximum plastic deformation is the depth of the depression, made after the cylinder sinks down into the ground. An additional, approximately equivalent alternative is given by the method that the velocity is chosen proportional to (the radius of the cylinder*the plastic parameter p of the ground material)$^{1/2}$.

Figure 12:
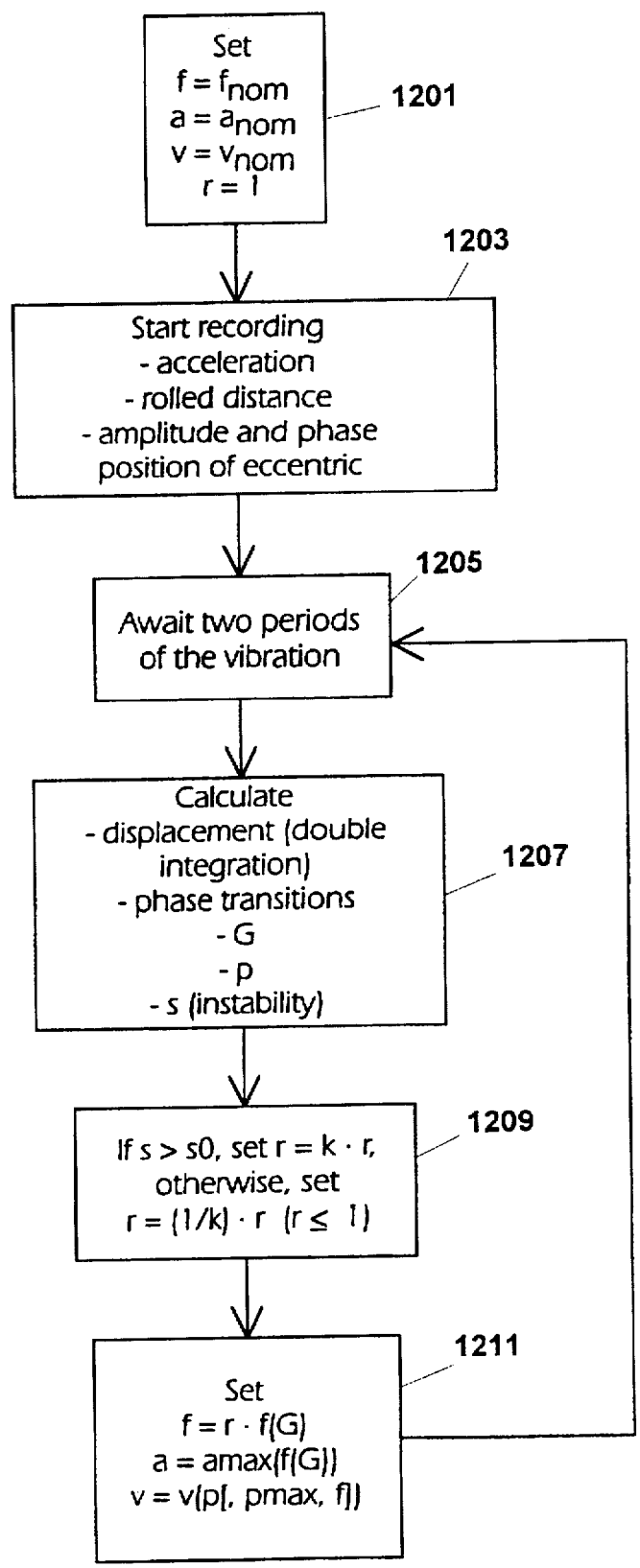
FIG. 12 shows a block diagram of the control method.

In FIG. 12 a block diagram for the control procedure is shown for the case where a desired stability is regulated only by changing the frequency of the vibration. The difference when regulating both frequency and amplitude is that two factors of reduction (compare to r below) are used and are given a relation to each other such that a regulation is made along lines essentially perpendicular to the curve 31 of limitation.

In a start block 1201 in the block diagram of FIG. 12 the vibrational frequency f is first set to a nominal value $f_{nom}$, its amplitude to a nominal value $a_{nom}$ and the rolling velocity v is given a start value $v_{nom}$. A parameter r is a reduction factor for the frequency and is given the value 1. In the block 1203 the compacting then starts by the fact that the roller is started with the initial values set and the recording of the acceleration of the drum, of the rolling velocity and of the amplitude and phase position of the eccentric system begins.

Then it is awaited in a block 1205 that two full periods of the vibration of the vibratory system have been completed, and then the procedure continues to a block 1207. In this first the displacement is calculated by means of a double integration of acceleration data and then the position for transitions between different stages are determined, i.e. the positions of the points A, B, C, D and E in FIGS. 6–8. The theoretical state equations can then be used to determine the shear modulus G and the plastic parameter p. Further the proportion s of half tone is determined as the quotient of the amplitudes for the harmonic components half tone and ground tone (having frequencies corresponding to half the frequency of excitation and the full frequency of excitation respectively).

In the next block 1209 it is tested whether the proportion half tone or the factor s of instability is larger than a predetermined constant value $s_0$, e.g. equal to 0.05 (5%). If it is the case the reduction factor of the frequency r is reduced by a multiplication by a suitable constant k, e.g. having the value 0.98. Otherwise the factor r of reduction is instead increased by division by the constant k with the subcondition that the value of r is not allowed to be larger than 1. Since the whole procedure will be repeated relatively often (15–25 times per second), the working point will oscillate to a position, which gives $s=s_0$. If the ground is changed, the working point will in a few periods be in a new position, which again gives $s=s_0$.

In the next block 1211 the new parameters of working can then be set, the frequency being set to the value corresponding to the product of the factor r of reduction and a calculated frequency value f(G), which advantageously is chosen as the above mentioned function (4), i.e. $f(G)=f_{nom}*(G/G_{nom})^q$, if it is possible, or otherwise the highest possible value (corresponding to the line 33 in FIG. 3) or the lowest possible value (corresponding to the line 35 in FIG. 3), the amplitude a is being set to a maximum value, given by amax(f(G)), which is the maximal amplitude at the frequency f(G) determined by the dimensions of the roller and the allowed strain on the roller, the rolling velocity v is set at a value, which is a function of the maximal plastic deformation $P_{max}$, the plastic parameter p and/or of the frequency f of excitation.

After this the procedure moves to block 1205 to again await that two new periods of the vibratory movement of the drum or that two new cycles of the excitation system has been completed, whereafter the block 1207 is executed as above.

Figure 13:
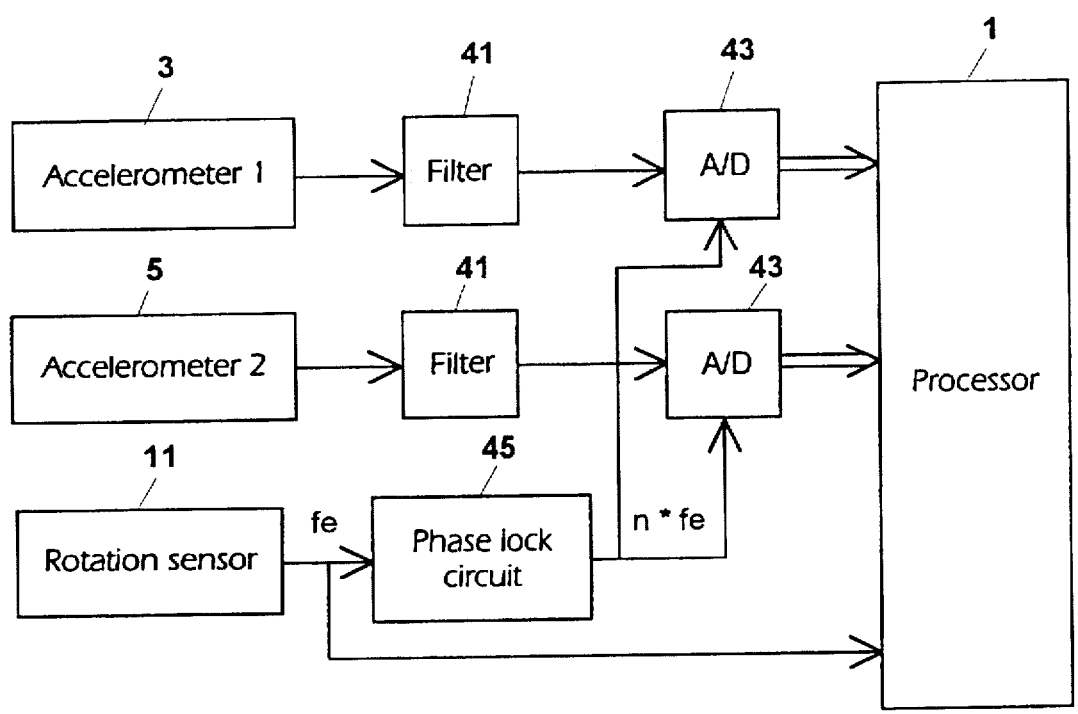
FIG. 13 shows schematically the electrical connections between the movement sensors and a processor.

During the calculations it is advantageous to use digital methods comprising a sampling of the analog signals from the accelerometers 3, 5. It can be carried out as described in detail with reference to FIG. 7 in the mentioned Swedish patent application "Optimal control of a compacting machine" and is here illustrated by FIG. 13. Between the two accelerometers 3, 5 and the processor 1 both a band-pass filter 41 and a A/D converter 43 are arranged. The sampling in the converters 43 is controlled by signals from a phase locking circuit 45, which in turn is controlled by the pulses from the rotation sensor 11. The phase locking circuit 45 emits pulses having a frequency $n \cdot f_e$, which is an integer multiple of the frequency $f_e$ of the pulses from the rotation sensor 11, where the fixed integer n e.g. can be chosen as a power of the number 2 such as n=128. Further the signals emitted from the phase locking circuit are in phase with the pulses from the rotation sensor 11 of the eccentric system. In general, in order to get acceptable results, there is a requirement on the conversion circuits between sensor and processor, that during all signal processing the phase positions of the signals are preserved. Hence a phase linear filter must be used. In the described sampling procedure the phase of the signal is also preserved and an effective phase linear noise filtering is facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for controlling a compacting apparatus moving along at an adjustable velocity compacting a ground, the compacting apparatus having a compacting body subjected to vibration by an eccentric system, the vibration having an adjustable frequency and an adjustable amplitude, the method comprising the steps of:

passing the compacting body over a segment of the ground at a first velocity;

compacting the ground using a first frequency and a first amplitude of vibration;

determining a shear modulus of the segment of the ground;

calculating a new value, based in part on the shear modulus of the segment of ground, for at least one of the first velocity, the first frequency, and the first amplitude; and changing the at least one of the first velocity, the first frequency, and the first amplitude to its respective new value.

2. The method defined in claim 1, wherein the steps of passing, compacting, determining, calculating, and changing are continually repeated while the compacting apparatus is in operation.

3. The method as defined in claim 2, wherein the step of calculating the new value is also based in part on the first frequency.

4. The method as defined in claim 1, wherein the step of calculating the new value is also based in part on at least one of the first velocity, the first frequency, and the first amplitude.

5. The method as defined in claim 1, further including the step of:

determining a plastic parameter of the segment of the ground, and wherein the step of calculating the new value is also based in part on the plastic parameter.

6. The method as defined in claim 5, wherein the compacting body is a drum having a radius, and wherein the step of calculating the new value, calculates a new value, $v_{new}$, for the first velocity based upon an equation:

$$v_{new}=k*(\text{the radius of the drum}*\text{the plastic parameter})^{1/2}$$

where k is a proportionality constant.

7. The method as defined in claim 1, wherein the step of calculating the new value, calculates a new value, $f_{new}$, for the first frequency based upon an equation:

$$f_{new}=f_{first}*(G/G_{nom})^q$$

where $f_{first}$ is the first frequency, G is the determined shear modulus of the segment of the ground, $G_{nom}$ is a nominal shear modulus assumed for the segment of the ground, and q is a positive number between 0 and 1.

8. The method as defined in claim 7, wherein q is between 0.25 and 0.40.

9. The method as defined in claim 8, wherein q is approximately equal to ⅓.

10. The method as defined in claim 1, wherein the step of calculating the new value, calculates a new value for the first amplitude, the new value being constrained by an upper limit, the upper limit being an amplitude of vibration which if exceeded will cause damage to the compacting apparatus.

11. The method as defined in claim 1, further including the step of:
   determining an acceleration of the compacting body as the compacting body passes over the segment of the ground; and
   determining whether the vibration of the compacting body is stable, and if unstable reducing the frequency of vibration, while holding the amplitude of vibration steady, until the compacting body is determined to be stable.

12. The method as defined in claim 1, further including the step of:
   determining an acceleration of the compacting body as the compacting body passes over the segment of the ground; and
   determining whether the vibration of the compacting body is stable, and if unstable reducing the frequency of vibration and the amplitude of vibration, until the compacting body is determined to be stable.

13. A method of measuring a shear modulus of a ground while the ground is being compacted by a compacting apparatus moving along the ground, the compacting apparatus having a compacting body subjected to vibration by an eccentric system, the vibration having an amplitude and a phase, the method comprising the steps of:
   passing the compacting body over a segment of the ground;
   determining an acceleration of the compacting body as a function of time in an acceleration direction, the acceleration direction being in a plane which is approximately tangential to the segment of the ground and approximately parallel to a movement direction of the compacting body, and the acceleration direction being within 45 degrees of a vertical line, contained in the plane; and
   determining a shear modulus of the segment of the ground based upon the amplitude of the vibration, the phase of the vibration, the determined acceleration of the compacting body, and fixed constants relating to physical parameters of the compacting apparatus.

14. The method as defined in claim 13, further including the step of:
   determining transition states as a function of time, the transition states being defined by a change in an interaction between the compacting body and the segment of the ground.

15. The method as defined in claim 13, further including the step of:
   determining a plastic parameter of the segment of the ground based upon at least the determined acceleration of the compacting body.

16. A control device for a compacting apparatus having a compacting body, a motor for moving the compacting body over a ground with a first velocity, and an eccentric system for imparting a vibration to the compacting body to compact a segment of the ground, the vibration having a first frequency and a first amplitude, the control device comprising:
   means for determining a shear modulus value of the segment of the ground;
   means for calculating a new value, using the shear modulus of the segment of ground, for at least one of the first velocity, the first frequency, and the first amplitude; and
   means for changing the at least one of the first velocity, the first frequency, and the first amplitude to its respective new value.

17. The control device as defined in claim 16, further including:
   means for determining a plastic parameter value of the segment of the ground, and wherein the means for calculating the new value also uses the plastic parameter value.

18. The control device as defined in claim 17, wherein the compacting body is a drum having a radius, and wherein the means for calculating the new value, calculates a new value, $v_{new}$, for the first velocity based upon an equation:

$$v_{new} = k * (\text{the radius of the drum} * \text{the plastic parameter})^{1/2}$$

where k is a proportionality constant.

19. The control device as defined in claim 16, wherein the means for calculating the new value, calculates a new value, $f_{new}$, for the first frequency based upon an equation:

$$f_{new} = f_{first} * (G/G_{nom})^q$$

where $f_{first}$ is the first frequency, G is the determined shear modulus of the segment of the ground, $G_{nom}$ is a nominal shear modulus assumed for the segment of the ground, and q is a positive number between 0 and 1.

20. The control device as defined in claim 19, wherein q is between 0.25 and 0.40.

21. The control device as defined in claim 20, wherein q is approximately equal to $\frac{1}{3}$.

22. The control device as defined in claim 16, wherein the means for calculating the new value, calculates a new value for the first amplitude, the new value being constrained by an upper limit, the upper limit being an amplitude of vibration which if exceeded will cause damage to the compacting apparatus.

23. The control device as defined in claim 16, further including:
   means for determining an acceleration of the compacting body as the compacting body passes over the segment of the ground; and
   means for determining whether the vibration of the compacting body is stable, and if unstable reducing the frequency of vibration, while holding the amplitude of vibration steady, until the compacting body is determined to be stable.

24. The control device as defined in claim 16, further including:
   means for determining an acceleration of the compacting body as the compacting body passes over the segment of the ground; and
   means for determining whether the vibration of the compacting body is stable, and if unstable reducing the frequency of vibration and the amplitude of vibration, until the compacting body is determined to be stable.

25. A measuring device for measuring a shear modulus of a ground while the ground is being compacted by a compacting apparatus moving along a segment of the ground, the compacting apparatus having a compacting body subjected to vibration by an eccentric system, the vibration having an amplitude and a phase, the measuring device comprising:
   at least one accelerometer for determining an acceleration of the compacting body as a function of time in an acceleration direction, the acceleration direction being in a plane approximately tangential to the segment of the ground and approximately parallel to a movement direction of the compacting body, and the acceleration direction being within 45 degrees of a vertical line, contained in the plane; and means for calculating the shear modulus of the segment of the ground based upon the amplitude of the vibration, the phase of the vibration, the determined acceleration of the compacting body, and fixed constants relating to physical parameters of the compacting apparatus.

26. The measuring device as defined in claim 25, wherein the at least one accelerometer includes two accelerometers, the two accelerometers being arranged to measure the acceleration of the compacting body in directions which are essentially perpendicular to each other.

27. The measuring device as defined in claim 25, further including:

means for determining transition states of the compacting body as a function of time, the transition states being defined by a change in an interaction between the compacting body and the segment of the ground.

28. The measuring device as defined in claim 25, further including:

means for determining a plastic parameter of the segment of the ground based upon at least the determined acceleration of the compacting body.

* * * * *